(12) United States Patent
Burkhalter

(10) Patent No.: US 9,861,220 B2
(45) Date of Patent: Jan. 9, 2018

(54) SLIDABLE ANTI-FATIGUE MAT

(71) Applicant: John Charles Burkhalter, Gainesville, GA (US)

(72) Inventor: John Charles Burkhalter, Gainesville, GA (US)

(*) Notice: Subject to any disclaimer, the term of this patent is extended or adjusted under 35 U.S.C. 154(b) by 334 days.

(21) Appl. No.: 14/638,169

(22) Filed: Mar. 4, 2015

(65) Prior Publication Data

US 2016/0255977 A1    Sep. 8, 2016

(51) Int. Cl.
*A47G 27/02*        (2006.01)
*B32B 5/02*         (2006.01)
(Continued)

(52) U.S. Cl.
CPC ............ *A47G 27/0231* (2013.01); *B32B 3/02* (2013.01); *B32B 3/08* (2013.01); *B32B 3/085* (2013.01); *B32B 5/02* (2013.01); *B32B 5/022* (2013.01); *B32B 5/024* (2013.01); *B32B 5/18* (2013.01); *B32B 5/24* (2013.01); *B32B 5/245* (2013.01); *B32B 5/26* (2013.01); *B32B 7/02* (2013.01); *B32B 15/04* (2013.01); *B32B 15/08* (2013.01); *B32B 15/14* (2013.01); *B32B 19/04* (2013.01); *B32B 25/00* (2013.01); *B32B 25/04* (2013.01); *B32B 25/045* (2013.01); *B32B 25/08* (2013.01); *B32B 25/10* (2013.01); *B32B 25/12* (2013.01); *B32B 25/14* (2013.01); *B32B 27/06* (2013.01); *B32B 27/065* (2013.01); *B32B 27/12* (2013.01); *B32B 27/283* (2013.01); *B32B 27/30* (2013.01); *B32B 27/304* (2013.01); *B32B 27/32* (2013.01); (Continued)

(58) Field of Classification Search
CPC ............... A47G 27/02; A47G 27/0212; A47G 27/0231; A47G 27/00; A47G 27/0218; A47G 27/0243; A47G 27/0281; A47G 27/0225; A47G 27/04; Y10T 428/22; B32B 2471/00; B32B 2471/04; B32B 2471/02
USPC ............... 428/67; 4/580, 581, 582, 583
See application file for complete search history.

(56) References Cited

U.S. PATENT DOCUMENTS 3,104,195 A * 9/1963 Warnberg .......... A47G 27/0225
                                                    428/138
5,362,544 A * 11/1994 Reuben .................. A47L 23/266
                                                    428/95
(Continued)

FOREIGN PATENT DOCUMENTS

GB      2262437 A  *  6/1993  .......... A47G 27/0412
WO  WO-2012107740 A1 * 8/2012  .......... A47G 27/0206

*Primary Examiner* — Maria V Ewald
*Assistant Examiner* — Ethan A. Utt
(74) *Attorney, Agent, or Firm* — Southeast IP Group, LLC.; Thomas L. Moses; Randolph J. Tucker

(57) ABSTRACT

A moveable anti-fatigue mat that can be moved by a user's foot without the need for the user to bend over. In one embodiment, the anti-fatigue mat comprises a cushioned top layer affixed to a high friction bottom layer, wherein a low friction activation pad is positioned on or within the bottom layer. The activation pad can be attached so that a bottom surface protrudes below or is flush with the bottom surface of the bottom layer, and the activation pad is preferably located near the edge of the bottom layer. The anti-fatigue mat may be slid laterally on a floor or surface by a user's foot when a user places his foot on the mat directly above the activation pad and applies pressure downward and in the direction the user wishes the mat to move.

16 Claims, 4 Drawing Sheets

(51) Int. Cl.
  *B32B 5/18* (2006.01)
  *B32B 7/02* (2006.01)
  *B32B 25/00* (2006.01)
  *B32B 25/04* (2006.01)
  *B32B 25/08* (2006.01)
  *B32B 25/10* (2006.01)
  *B32B 27/12* (2006.01)
  *B32B 27/30* (2006.01)
  *B32B 5/26* (2006.01)
  *B32B 15/04* (2006.01)
  *B32B 15/08* (2006.01)
  *B32B 15/14* (2006.01)
  *B32B 25/12* (2006.01)
  *B32B 25/14* (2006.01)
  *B32B 27/06* (2006.01)
  *B32B 27/28* (2006.01)
  *B32B 27/32* (2006.01)
  *B32B 27/34* (2006.01)
  *B32B 27/40* (2006.01)
  *B32B 3/02* (2006.01)
  *B32B 3/08* (2006.01)
  *B32B 5/24* (2006.01)
  *B32B 19/04* (2006.01)
(52) U.S. Cl.
  CPC ............ *B32B 27/322* (2013.01); *B32B 27/34* (2013.01); *B32B 27/40* (2013.01); *B32B 2250/02* (2013.01); *B32B 2262/02* (2013.01); *B32B 2262/0253* (2013.01); *B32B 2266/025* (2013.01); *B32B 2266/0207* (2013.01); *B32B 2266/0214* (2013.01); *B32B 2266/0278* (2013.01); *B32B 2266/0292* (2013.01); *B32B 2266/06* (2013.01); *B32B 2266/08* (2013.01); *B32B 2270/00* (2013.01); *B32B 2307/546* (2013.01); *B32B 2307/744* (2013.01); *B32B 2471/04* (2013.01)

(56) References Cited

U.S. PATENT DOCUMENTS

| | | | | |
|---|---|---|---|---|
| 5,876,825 | A * | 3/1999 | Daley | B44F 1/02 428/67 |
| 2003/0009839 | A1* | 1/2003 | Streutker | A47L 13/42 15/228 |
| 2010/0077635 | A1* | 4/2010 | Baucom | A41D 13/065 36/61 |
| 2010/0083541 | A1* | 4/2010 | Baucom | A47G 27/0212 36/25 R |
| 2011/0318523 | A1* | 12/2011 | Todd | A47G 27/0231 428/67 |
| 2012/0190516 | A1* | 7/2012 | Geotsalitis | A63B 22/20 482/142 |
| 2013/0192162 | A1 | 8/2013 | Foley et al. | |
| 2015/0320247 | A1* | 11/2015 | McMahan | A47G 27/0231 29/428 |
| 2017/0172331 | A1* | 6/2017 | Publicover | A47G 27/0212 |

* cited by examiner

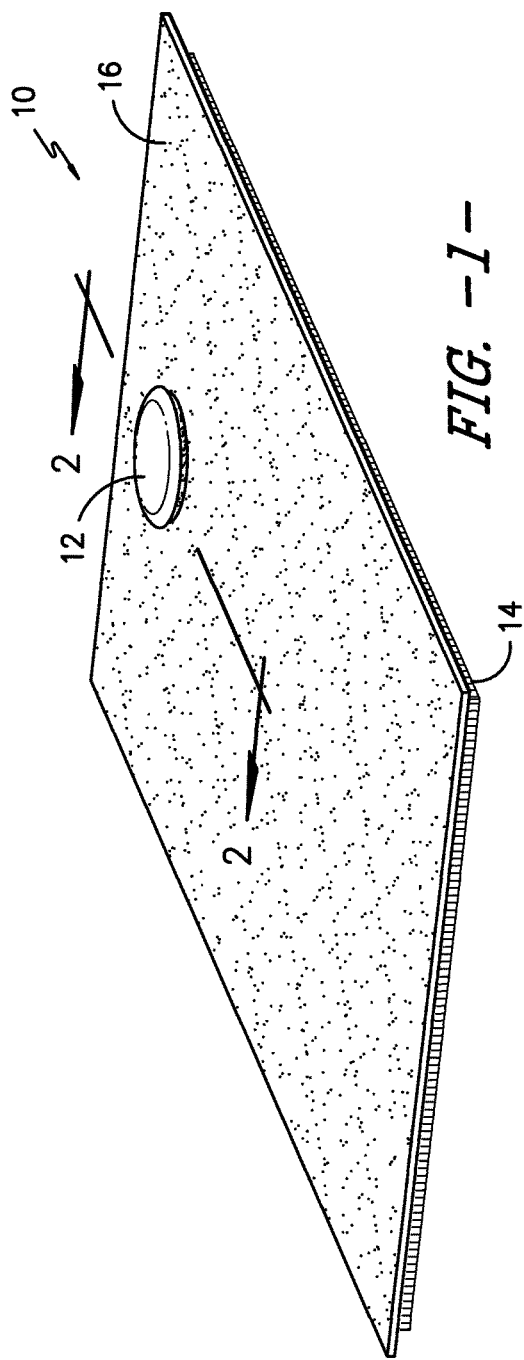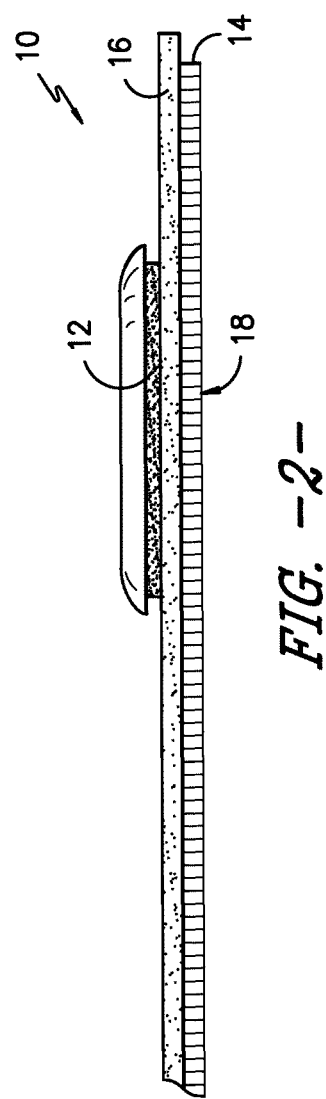

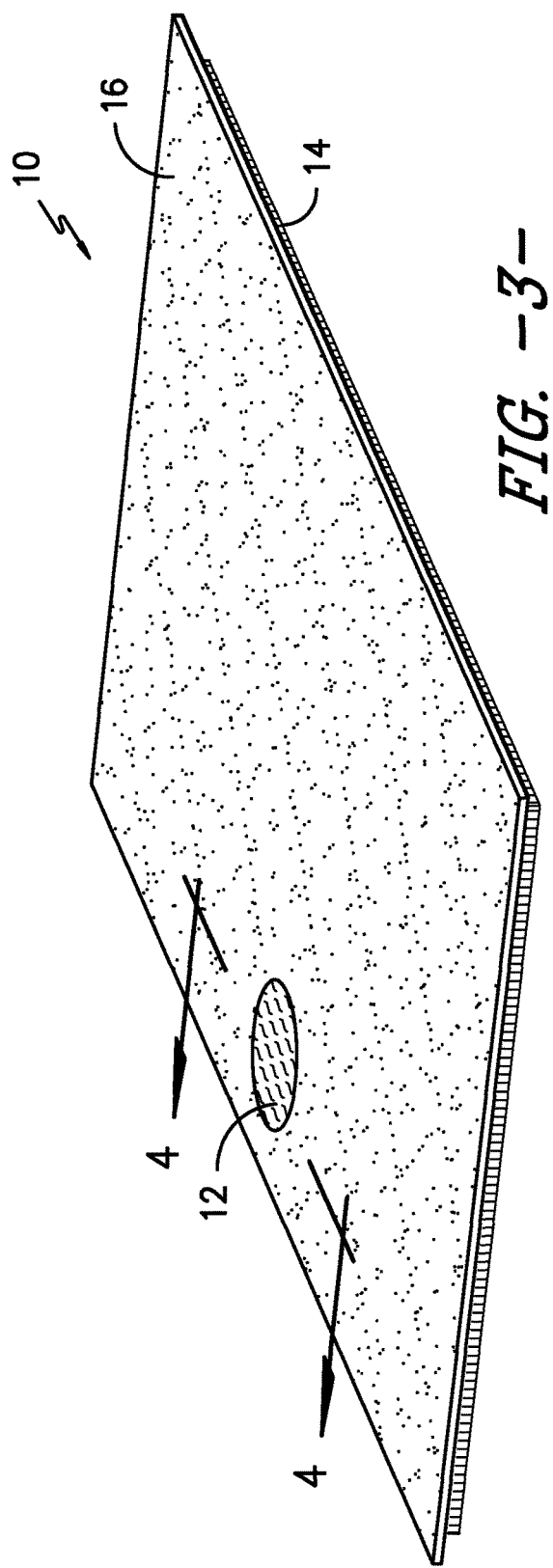
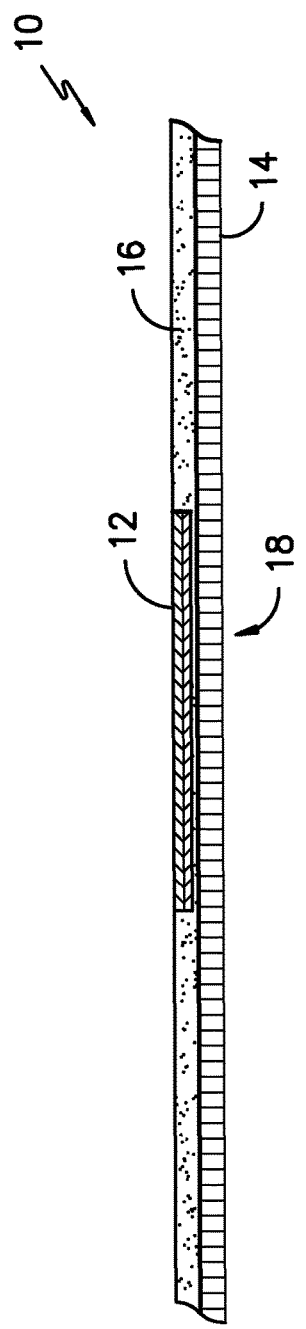

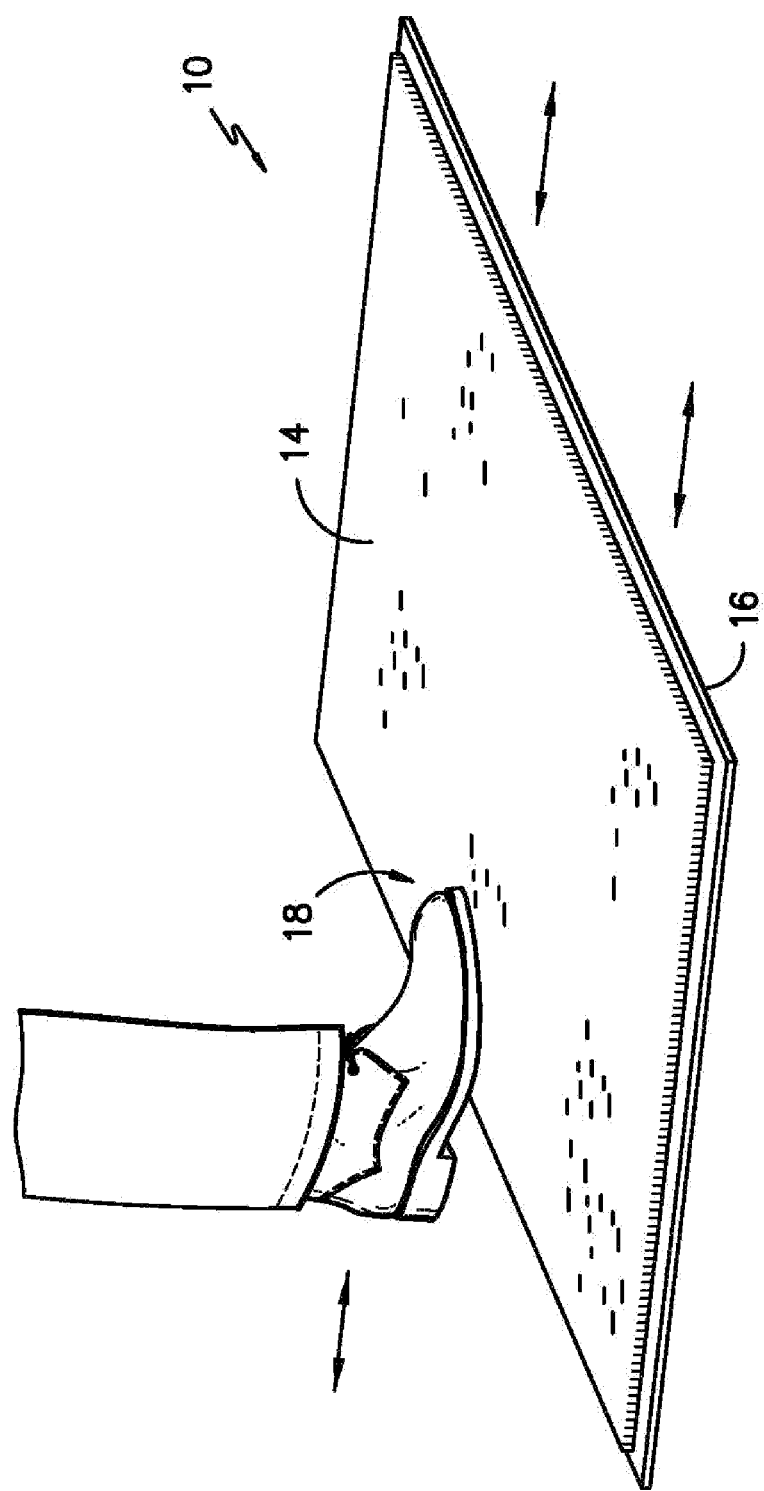
FIG. -5-

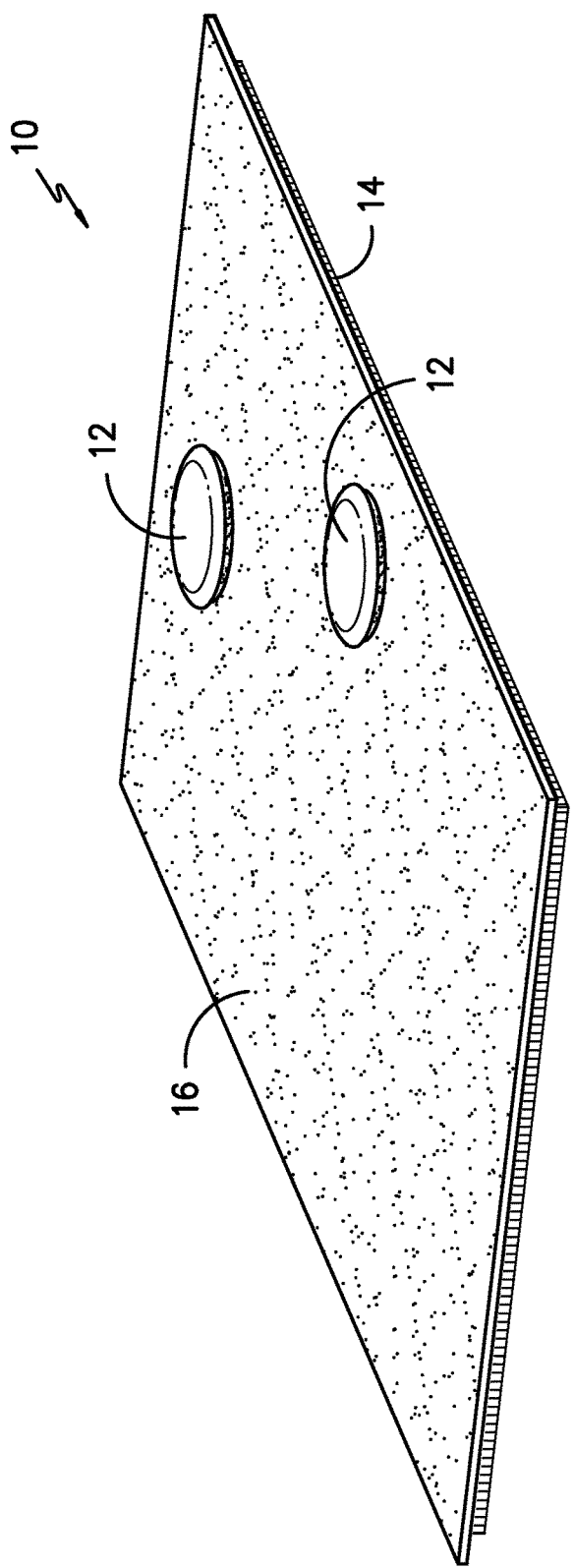
FIG. -6-

SLIDABLE ANTI-FATIGUE MAT

BACKGROUND OF THE INVENTION

The present invention relates generally to floor mats. In particular, the present invention relates to anti-fatigue floor mats which generally are known for their anti-slip properties but may be slid, repositioned and adjusted without the necessity of bending over to pick up the mat.

Inactivity, particularly sitting for long periods, has been shown to place individuals at risk of increased health problems. Standing for long periods, as well, can increase the risk of particular health problems. To help alleviate these problems, sit and stand desks, which allow a person to change positions throughout the day by moving to accommodate a person in a sitting or standing position, have become popular. Often, anti-fatigue mats are sold in conjunction with sit and stand desks to help make the standing experience more comfortable and healthy for individuals. Individuals are able to stand comfortably for longer periods with fewer negative effects with anti-fatigue mats.

However, current anti-fatigue mats have drawbacks. For example, anti-fatigue mats are not amenable to use with a chair. Even mats with beveled edges to allow easy on and off access of a chair suffer from issues, such as difficulty moving the chair on and off of the mat, and having a chair sink into the mats due to their necessarily soft surfaces thereof. Chairs are difficult to roll around on soft surfaces, such as those essential to anti-fatigue mats, and deformations in the mat may form due to use of a chair on such a soft surface for any extended period of time.

As a result, the normal use of an anti-fatigue mat with a sit and stand desk involves either trial and discontinuation, the purchase of a hard mat that provides little to no benefit when standing, or moving the mat each time a user wishes to change positions. Typically, a user must physically bend over and pick up the mat and move it to another position. This action is required because anti-fatigue mats, like most floor coverings, are made of materials that resist movement of the mat when on the floor, to reduce the risk of a user slipping, tripping or falling due to unwanted mat movement.

Thus, there is a need for an anti-fatigue mat that may be easily slid into a useful position without the need for bending over and picking up the mat and including retention of the basic nonslip characteristics of such mats when in use on a floor.

BRIEF SUMMARY OF THE INVENTION

In accordance with one aspect of the invention, a slidable anti-fatigue mat is provided that may be used with sit and stand desks to allow users, without bending over, to easily move the mat. The novel and non-obvious anti-fatigue mat has a high friction bottom layer, preventing or hindering lateral movement during normal use, standing or walking over the mat, and a low-friction activation pad attached to the bottom of the mat, allowing movement of the mat by application of a small amount of force to a particular location on the mat when no one is standing on the mat.

As is well known in the art, the anti-fatigue mat may be made of materials that provide a soft surface when stood upon and a high friction bottom layer. These materials may differ from one another and may be selected based on the floor surface to be covered by the mat. The particular materials used may be significant because, for example, a material that may provide sufficient friction on hard surfaces, such as wood, tile, concrete or laminate floors, may not provide sufficient friction on soft surfaces, such as carpet.

As mentioned heretofore, the anti-fatigue mat may include an activation pad positioned on an underside thereof, wherein the activation pad may be made from a material that has a low coefficient of friction as applied to a surface it is used on. The activation pad may be made of different materials to correspond to different surfaces. Further, materials to be used for a mat and activation pad may be matched together to provide characteristics for optimal use on a particular surface. The activation pad may be attached on the bottom of the anti-fatigue mat, preferably close to one of the edges. More than one activation pad may be attached to an underside of the mat, as desired. Alternately, activation pads may be located anywhere on the underside as desired and convenient. The position of an activation pad on the underside of the mat may be based on the direction a user wishes to move the mat. In a preferred embodiment, the activation pad may be placed on the underside of the mat near an edge wherein a user, standing on the floor next to that edge, can place the ball of his or her foot on the mat directly above the activation pad and push the mat forward or pull the mat backward. Alternately, a user may also move the mat in other desired directions.

Further, the activation pad may protrude from the bottom of the mat or may be flush in relation to the bottom layer of an anti-fatigue mat. In one embodiment, the activation pad protrudes below the bottom surface of the mat, which may create a bulge in the mat that is visible from the top surface thereof. This arrangement has the advantage of providing a visual indicator of the position of the activation pad (and activation area), so that user may easily identify and use the activation area to move the mat in a lateral direction. In a preferred embodiment, the activation pad is circular in shape, but it should be understood that activation pads of any desired shape may be used.

The anti-fatigue mat may be slid in and out of an operative position, without the necessity of a user bending over, by utilization of the activation pad. To utilize the activation pad, a user standing next to the mat on the side nearest the activation pad may place his foot on the mat at the spot above the activation pad's location and apply pressure both downward and laterally, generally pushing or pulling the mat. The anti-fatigue mat with the activation pad provides a foot activated method of movement that obviates the necessity of bending over, which is problematic for users with back problems and inefficient for all users. This arrangement allows the mat to remain in place during normal use and, further, allows the mat to be easily moved laterally, when lateral movement is intended.

BRIEF DESCRIPTION OF THE DRAWINGS

These and other features, aspects, and advantages of the present invention will become better understood with regard to the following description, appended claims, and accompanying drawings where:

FIG. 1 is a bottom perspective view of one embodiment of the slidable anti-fatigue mat showing the underside of a mat;

FIG. 2 is a bottom cross-section view of one embodiment of the slidable anti-fatigue mat along line 2-2 in FIG. 1;

FIG. 3 is a bottom perspective view of one embodiment of the slidable anti-fatigue mat showing the underside of a mat;

FIG. 4 is a bottom cross-section view of one embodiment of the slidable anti-fatigue mat along line 4-4 in FIG. 3;

FIG. 5 is a top view of one embodiment of the slidable anti-fatigue mat in use showing the upper surface with a foot on the activation area; and FIG. 6 is a bottom perspective view of one embodiment of the slidable anti-fatigue mat of the underside of a mat with two activation pads.

DETAILED DESCRIPTION OF THE INVENTION

The present invention includes an anti-fatigue mat 10 that is capable of being easily slid into and out of a desired position in a lateral direction on a floor surface, without requiring a user to bend over and pick up the mat 10 and without sacrificing the desired frictional engagement between mat 10 and floor when movement is not desired.

In one embodiment, shown in FIGS. 1-5, the anti-fatigue mat 10 may be made from a cushioned top 14 attached to a bottom layer 16 having a high coefficient of friction. As shown in FIGS. 1-4, a low-friction activation pad 12 may be disposed on a bottom portion of the mat 10. The cushioned top 14 may be made from a single, homogenous layer or comprise separate elements. A homogenous cushioned top 14 may be a woven fabric, foam, gel, or solid construction, or some combination thereof, such as a nitrile rubber with polypropylene fabric strands dispersed within it. A homogenous cushioned top 14 may be made of natural rubber, synthetic rubber, neoprene, nylon, a vinyl containing compound, polyvinyl chloride, polyethylene, polypropylene, silicone, polyurethane, a nitrile containing compound, gel, polypropylene fabric, nitrile rubber, open cell foam, closed cell foam, some combination thereof, or like material. Alternatively, a cushioned top 14 may be made of a soft element covered with a more rigid shell element that is still flexible and resilient but is not as soft as the soft element. The soft element may be elastic in nature. The soft element may be a gel, foam, fabric, or solid material, or some combination thereof. For example, the cushioned top 14 may be made of a vinyl containing compound covering or partially covering a foam material. A soft element may be made of polyether foam, polyester foam, polyethylene foam, foam rubber, cellulose foam, polyurethane foam, polypropylene foam, nitrile blend foam, an open cell foam, closed cell foam, polypropylene fabric, a nitrile containing compound, fabric, gel, rubber, nitrile rubber, polyurethane rubber, some combination of these, or other suitable material. The shell element may be made of woven fabric, gel, foam, or a solid construction to encase the soft element. For example, the cushioned top 14 may consist of polypropylene fabric covering or partially covering a gel or solid soft element. The shell element may be made of or with a polymer compound. The shell element may be made with materials such as natural rubber, synthetic rubber, neoprene, nylon, a vinyl containing compound, polyvinyl chloride, polyethylene, polypropylene, polypropylene fabrics, silicone, polyurethane, a nitrile containing compound, nitrile rubber, closed cell foam, open cell foam, some combination thereof, or any other suitable compound. For example, the shell material may be a nitrile rubber with polypropylene fabric strands dispersed within it.

The cushioned top 14 and bottom layer 16 may be separately formed and attached. Additionally, the cushioned top 14 and bottom layer 16 may be made of the same or different materials depending upon desired use. For example, for a certain type of floor, a bottom layer 16 that is made of a generally harder material might be preferable. However, that particular bottom layer 16 may not be cushioned enough to provide anti-fatigue characteristics to the mat 10 without the addition of a cushioned top 14 made from a softer material. Alternately, for a different type of floor, the anti-fatigue mat 10 may be formed integrally from a single layer of material, the material providing sufficient friction with the floor and sufficient anti-fatigue cushioning. Further, the materials to make the mat 10 may be chosen so that the mat 10 is within certain tolerances of thickness and rigidity, so that mat 10 may move without rolling or buckling of the edges of the mat 10. The integrally formed mat 10 or just the bottom layer 16 may be made of or with one or more materials, including polymer compound materials such as natural rubber, synthetic rubber, neoprene, nylon, a vinyl containing compound, polyvinyl chloride, polyethylene, polypropylene, silicone, polyurethane, nitrile rubber, a nitrile containing compound, or any other suitable compound. The integrally formed mat 10 or just the bottom layer 16 may be a woven fabric, foam, gel, or solid construction, or some combination thereof, such as polypropylene fabric, nitrile rubber, nitrile rubber with polypropylene fabric strands dispersed within it, a closed cell foam, or an open cell foam.

As shown in FIGS. 1-4, the bottom layer 16 of the mat 10 may also have an activation pad 12 attached thereto. The activation pad 12 may be attached so that it protrudes downwardly from the underside of the bottom layer 16 of the mat 10, as shown in FIGS. 1 and 2, or alternatively so that the bottom portion of the activation pad 12 is effectively flush with the underside of the bottom layer 16 as shown in FIGS. 3 and 4. An activation area 18 may be located on the cushioned top 14 in an area directly above the location the activation pad 12 is positioned on the bottom layer 16. A protruding activation pad 12, as shown in FIGS. 1 and 2, may make identification of the activation area 18 easier by causing a slight bulge in the upper surface of the mat 10. The activation area 18 may also be identified by logo placement or other visible sign or marking on the mat 10. In an embodiment shown in FIGS. 3 and 4, the activation pad is flush with the bottom of the mat, creating a smooth appearance on both the bottom and top surfaces thereof. In a preferred embodiment, the activation pad 12 may be circular, as shown in FIGS. 1-4. However, an activation pad 12 may alternately be square, rectangular, or any other desired shape that allows for easy movement of the mat 10 when desired. Additionally, a diverse range of sizes for an activation pad 12 may be utilized.

An activation pad 12 may be formed from a material that has a lower coefficient of friction than the rest of the underside of the mat 10 when applied to and measured against the flooring surface it is being used on. Materials the activation pad 12 may be made of may include plastic, felt, polytetrafluoroethylene, nylon, asbestos, metal, metal alloys or any other suitable material. In a preferred embodiment, the activation pad 12 is formed from different materials than the bottom layer 16 of the mat 10. Additionally, the activation pad 12 may be formed from different materials to correspond to different surfaces. In a preferred embodiment, the characteristics of the mats 10 and activation pads 12 may be matched to provide an optimum coefficient of friction of the entire mat 10, which allows light foot pressure to move the mat 10 and retains the desired anti-slip characteristics of the mat 10 when the activation pad is not engaged by a user.

Different combinations of materials for the activation pad 12 and bottom layer 16 may be desired for different floor surfaces. For example, for wood floors, a polyvinyl chloride bottom layer 16, might be preferable, along with a low friction, soft surface activation pad 12, such as felt, to prevent scratches on the wood. However, for low pile carpets and tile floors, a high density and friction material, such as polyurethane or rubber, may be best suited for a bottom layer 16 and a hard, low friction material, such as plastic, may be best suited for an activation pad 12. Alternative combinations may include pairing of a mat 10 made of polyvinyl chloride, nitrile rubber, propylene fabric, or other desired materials with at least one activation pad 12 made of plastic, felt, asbestos, polytetrafluoroethylene, nylon, or other desired materials in combinations that work best for a particular flooring surface.

The activation pad 12 is preferably positioned on the bottom layer 16 of the mat 10 close to an edge. This location of the activation pad 12 allows easy access to the activation area 18 on the mat 10. However, it is still anticipated that the activation pad 12 may be attached to the bottom layer 16 in other desired locations. Further, the location of the activation pad 12 may allow for easier movement of the mat 10 in some lateral directions than others. In a preferred embodiment, lateral movement of the mat 10 may be best in directions extending to and from the edge of the mat 10 opposite the activation area 18, as shown in FIG. 5. Additional activation pads 12 may be attached to the bottom layer 16 in additional locations in order to allow for more convenient activation areas 18 and increased range of easy movement, as shown in FIG. 6.

In an alternate embodiment, as shown in FIGS. 3 and 4, the anti-fatigue mat 10 may have an activation region 12, made from the same or different material than the mat 10, wherein the activation region 12 has a lower coefficient of friction than the underside of the mat 10 relative to a common surface. The activation region 12 may be created by heat treatment, chemical change, or structural alteration to create a surface area on the underside of the mat 10 where the coefficient of friction for the surface area of the activation region 12 is lower than that of the underside of the mat 10 relative to a common surface.

In use, the anti-fatigue mat 10 with at least one activation pad 12 may be placed by a user in a desired location on a floor, such as in front of a sit and stand desk. When a user wishes to move the mat 10, a user may, standing off of the mat 10 next to the activation area 18 and place light pressure with the ball of his or her foot on the activation area 18 in a downward and lateral direction, causing the mat 10 to move in the desired direction, as shown in FIG. 5. The user may then quickly and easily position the mat 10 on the desired area of the floor, including underneath or beside a sit and stand desk. Once placed, the user may remove his or her foot from the activation area 18. A users' chair may be moved into the space previously occupied by the mat 10 for sitting at a desk. The mat 10 may be utilized as a soft footrest or may be simply positioned out of the way of the chair. Similarly, when a user wishes to move the mat 10 back into position for standing at a sit and stand desk, the user may sit or stand next to the activation area 18 on the mat 10 and place light pressure with the ball of his or her foot on the activation area 18 in a downward and lateral direction, causing the mat 10 to move in the desired direction, as shown in FIG. 5. The user may then quickly and easily position the mat 10 on the desired area of the floor, such as in front of a sit and stand desk. The mat 10 then may be utilized to be stood on or walked over. The mat 10 will remain in place during such normal use.

For reference, it is understood that a coefficient of friction, as used herein, is not an absolute value, but the result of the interaction of two surfaces. As used herein, reference to the coefficient of friction or any relationship between coefficients of friction for elements implies a common surface in relation to the element(s) being discussed. For example, if it is presented that the underside of the mat 10 or bottom layer 16 has a first coefficient of friction and an activation pad 12 has a second coefficient of friction that is lower than the first, the second coefficient of friction is lower than the first in relation to a common surface.

The use of the activation pad 12 to move the mat 10 reduces the amount of force necessary to move the mat 10. The force required to move the mat 10 is less because the point where the force is applied, the activation pad 12 through the activation area 18, has a lower coefficient of friction with the floor than the bottom layer 16 of the mat 10. The amount of force together with the lower coefficient of friction operate to overcome the resistance between the bottom layer 16 and the floor. As a result, the mat 10 moves with less force when the force is applied to the activation pad 12 through the activation area 18 than when the force is applied to the bottom layer 16 through other locations on the mat 10.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An anti-fatigue mat for being stood upon comprising:
   a mat body having a top surface opposite a bottom surface, said bottom surface of said mat body being made from a first material having a first coefficient of friction relative to a flat common surface;
   wherein said bottom surface defines an activation region having a second coefficient of friction that is lower than said first coefficient of friction, relative to said common surface and said top surface above said activation region comprises an activation area; and
   wherein said bottom surface of said mat body and said activation region are configured to contact said flat common surface simultaneously and said mat body slides upon said common surface when force is applied to said activation area in order to apply said second coefficient of friction to said sliding motion.

2. An anti-fatigue mat comprising:
   a mat body having a top surface opposite a bottom surface, said mat body being made from a first material having a first coefficient of friction relative to a flat common surface;
   at least one activation pad attached to said bottom surface of said mat body, said activation pad being made from a second material having a second coefficient of friction that is lower than said first coefficient of friction, relative to said common surface;
   wherein said top surface of said mat body above said activation pad comprises an activation area;
   wherein a bottom surface of said activation pad protrudes downwardly below said bottom surface of said mat body; and
   wherein said bottom surface of said mat body and said activation pad are configured to contact said common surface simultaneously and said mat body slides upon said common surface when force is applied to said activation area in order to apply said second coefficient of friction to said sliding motion.

3. An anti-fatigue mat comprising:
   a mat body having a top surface opposite a bottom surface, said mat body being made from a first material having a first coefficient of friction relative to a common surface;
   at least one activation pad attached to said bottom surface of said mat body, said activation pad being made from a second material having a second coefficient of friction that is lower than said first coefficient of friction, relative to said common surface;
   wherein said top surface of said mat body above said activation pad comprises an activation area;
   wherein a bottom surface of said activation pad is generally flush with said bottom surface of said mat body so as to create a smooth appearance on said bottom surface; and
   wherein said bottom surface of said mat body and said activation pad are configured to contact said common surface and said mat body slides upon said common surface when force is applied to said activation area in order to apply said second coefficient of friction to said sliding motion.

4. The anti-fatigue mat set forth in claim 3, wherein said first material is selected from the group consisting of natural rubber, synthetic rubber, neoprene, nylon, a vinyl containing compound, polyvinyl chloride, polyethylene, polypropylene, silicone, polyurethane, polypropylene fabric, gel, a nitrile containing compound, nitrile rubber, closed cell foam, and open cell foam or some combination thereof.

5. The anti-fatigue mat set forth in claim 3, wherein said second material is selected from the group consisting of plastic, polytetrafluoroethylene, nylon, felt, metal, metal alloys, and asbestos.

6. The anti-fatigue mat set forth in claim 3, wherein said activation pad is positioned adjacent to an edge of said mat body.

7. The anti-fatigue mat set forth in claim 3, wherein said mat body comprises a cushioned top and a bottom layer, said bottom layer being made from said first material.

8. The anti-fatigue mat set forth in claim 7, wherein said first material is selected from the group consisting of natural rubber, synthetic rubber, neoprene, nylon, a vinyl containing compound, polyvinyl chloride, polyethylene, polypropylene, silicone, polyurethane, polypropylene fabric, gel, a nitrile containing compound, nitrile rubber, closed cell foam, and open cell foam or some combination thereof.

9. The anti-fatigue mat set forth in claim 7, wherein said cushioned top is made from a material selected from the group consisting of natural rubber, synthetic rubber, neoprene, nylon, a vinyl containing compound, polyvinyl chloride, polyethylene, polypropylene, silicone, polyurethane, a nitrile containing compound, gel, polypropylene fabric, nitrile rubber, open cell foam and closed cell foam, or some combination thereof.

10. The anti-fatigue mat set forth in claim 7, wherein said cushioned top comprises a soft element covered with a shell element.

11. The anti-fatigue mat set forth in claim 10, wherein said shell element is made from a material selected from the group consisting of natural rubber, synthetic rubber, neoprene, nylon, a vinyl containing compound, polyvinyl chloride, polyethylene, polypropylene, polypropylene fabric, silicone, a nitrile containing compound, nitrile rubber, closed cell foam, open cell foam and polyurethane, gel, or some combination thereof.

12. The anti-fatigue mat set forth in claim 10, wherein said soft element is made from a material selected from the group consisting of polyether foam, polyester foam, polyethylene foam, foam rubber, cellulose foam, polyurethane foam, polypropylene foam, nitrile blend foam, polypropylene fabric, a nitrile containing compound, rubber, nitrile rubber, polyurethane rubber, fabric, gel, closed cell foam, and open cell foam or some combination of thereof.

13. The anti-fatigue mat set forth in claim 7, wherein said first material is nitrile rubber, said second material is felt, and said cushioned top is made from polypropylene fabric.

14. The anti-fatigue mat set forth in claim 7, wherein said first material is foam rubber, said second material is plastic, and said cushioned top is made from nitrile rubber.

15. The anti-fatigue mat set forth in claim 3, wherein said first material is polyvinyl chloride and said second material is felt.

16. The anti-fatigue mat set forth in claim 3, wherein said first material is nitrile rubber and said second material is plastic.

* * * * *